(12) United States Patent
Khan et al.

(10) Patent No.: US 8,218,563 B2
(45) Date of Patent: Jul. 10, 2012

(54) METHOD AND SYSTEM FOR PROVIDING ADAPTIVE MODULATION AND CODING IN A MULTI-CARRIER WIRELESS NETWORK

(75) Inventors: Farooq Khan, Allen, TX (US);
Jiann-An Tsai, Plano, TX (US);
Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1553 days.

(21) Appl. No.: 11/504,452

(22) Filed: Aug. 15, 2006

(65) Prior Publication Data

US 2007/0104149 A1 May 10, 2007

Related U.S. Application Data

(60) Provisional application No. 60/733,668, filed on Nov. 4, 2005.

(51) Int. Cl.
*H04J 3/16* (2006.01)
(52) U.S. Cl. ........ 370/437; 370/206; 370/329; 370/334; 370/465
(58) Field of Classification Search .................. 370/329, 370/332, 437, 465
See application file for complete search history.

(56) References Cited

U.S. PATENT DOCUMENTS

| | | | |
|---|---|---|---|
| 6,108,374 A * | 8/2000 | Balachandran et al. ....... | 375/227 |
| 6,442,129 B1 * | 8/2002 | Yonge et al. ................... | 370/204 |
| 6,751,187 B2 * | 6/2004 | Walton et al. ................. | 370/210 |
| 6,754,169 B2 * | 6/2004 | Baum et al. .................... | 370/204 |
| 6,760,882 B1 * | 7/2004 | Gesbert et al. ................ | 714/774 |
| 6,947,748 B2 | 9/2005 | Li et al. | |
| 7,146,172 B2 * | 12/2006 | Li et al. ....................... | 455/452.1 |
| 7,542,514 B2 * | 6/2009 | Song et al. .................... | 375/260 |
| 2002/0110101 A1 * | 8/2002 | Gopalakrishnan et al. ... | 370/335 |
| 2003/0086371 A1 * | 5/2003 | Walton et al. ................. | 370/235 |
| 2003/0169681 A1 * | 9/2003 | Li et al. ......................... | 370/203 |
| 2004/0131038 A1 * | 7/2004 | Kim et al. ..................... | 370/342 |
| 2004/0264588 A1 * | 12/2004 | Song et al. .................... | 375/260 |
| 2005/0122928 A1 * | 6/2005 | Vijayan et al. ................ | 370/312 |
| 2006/0008020 A1 * | 1/2006 | Blankenship et al. ........ | 375/261 |

FOREIGN PATENT DOCUMENTS

| | | |
|---|---|---|
| EP | 1 492 294 A2 * | 12/2004 |
| WO | WO 99/12304 A1 | 3/1999 |
| WO | WO 02/25853 A2 | 3/2002 |
| WO | WO 02/31991 A2 | 4/2002 |
| WO | WO 02/33875 A1 | 4/2002 |
| WO | WO 02/49305 A2 | 6/2002 |

\* cited by examiner

*Primary Examiner* — Olumide T Ajibade Akonai
*Assistant Examiner* — Jaime Holliday

(57) ABSTRACT

A method of providing adaptive modulation and coding in a multi-carrier wireless network that includes a plurality of subscriber stations is provided. The method includes, for each of the subscriber stations, selecting a type of modulation and a coding rate based on a signal-to-interference-plus-noise ratio (SINR) variance.

23 Claims, 10 Drawing Sheets

CAPACITY = 2.00 b/s/Hz

CAPACITY = 1.97 b/s/Hz

CAPACITY = 1.84 b/s/Hz

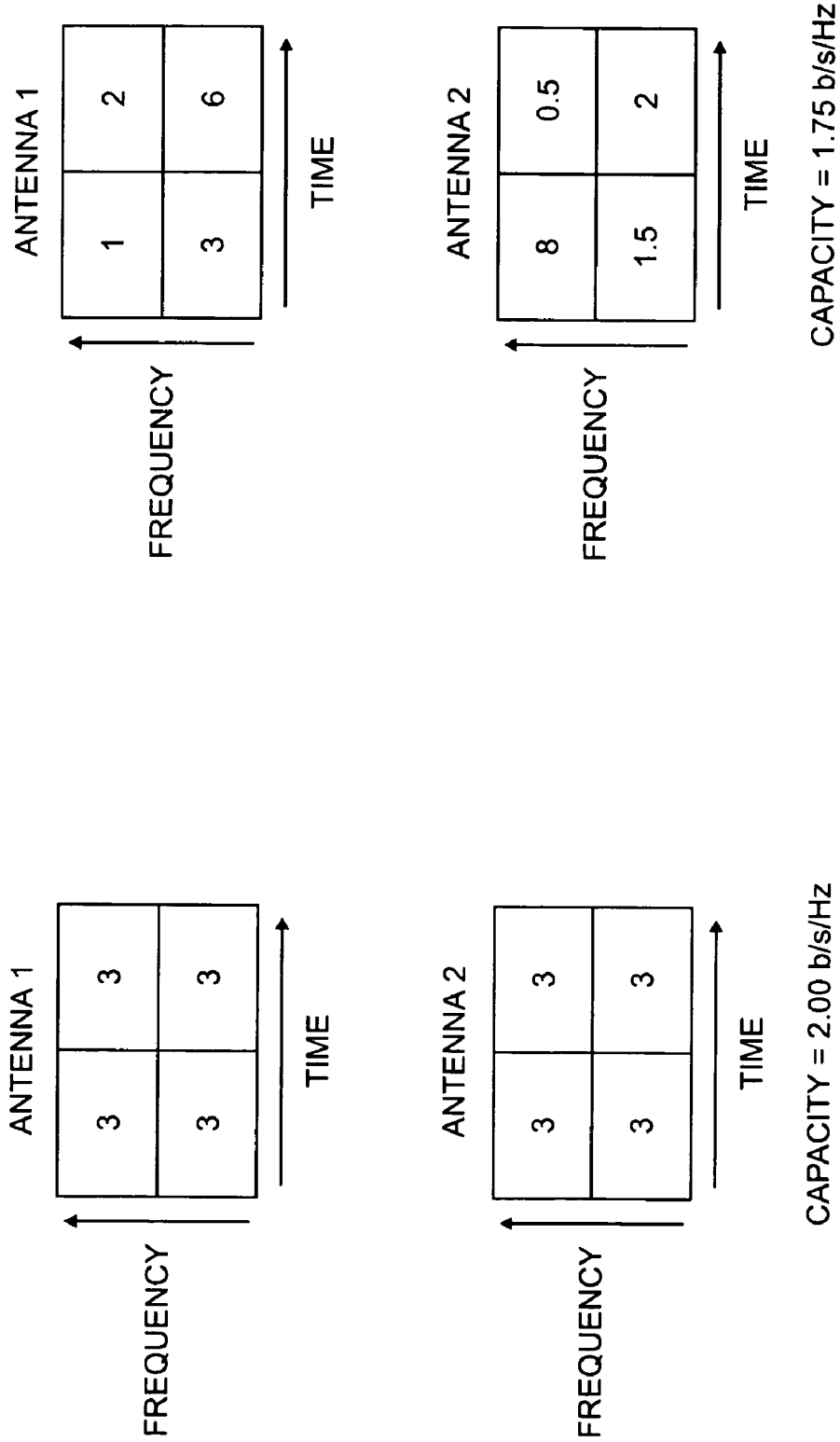

METHOD AND SYSTEM FOR PROVIDING ADAPTIVE MODULATION AND CODING IN A MULTI-CARRIER WIRELESS NETWORK

CROSS-REFERENCE TO RELATED APPLICATION AND CLAIM OF PRIORITY

The present invention is related to the invention disclosed in U.S. Provisional Patent Application Ser. No. 60/733,668, titled "Adaptive Modulation and Coding," filed on Nov. 4, 2005. Patent Application Ser. No. 60/733,668 is assigned to the assignee of the present application. The subject matter disclosed in Patent Application Ser. No. 60/733,668 is hereby incorporated by reference into the present disclosure as if fully set forth herein. The present application hereby claims priority under 35 U.S.C. §119(e) to Patent Application Ser. No. 60/733,668.

TECHNICAL FIELD OF THE INVENTION

The present disclosure relates generally to wireless communications and, more specifically, to a method and system for providing adaptive modulation and coding in a multi-carrier wireless network.

BACKGROUND OF THE INVENTION

Orthogonal frequency division multiplexing (OFDM) is a multi-carrier transmission technique in which a user transmits on many orthogonal frequencies (or subcarriers or tones). The orthogonal subcarriers (or tones) are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user.

The performance of an OFDM network may be improved by selecting modulation and coding rates at a base station based on channel quality feedback from the receiving stations (e.g., subscriber stations) in the wireless network. However, suboptimal selections of coding rate and modulation result in link inefficiency and an eventual degradation in the wireless system performance. Therefore, there is a need in the art for an OFDM network that is able to provide coding and modulation with increased link efficiency under various channel conditions, thereby improving network performance.

SUMMARY OF THE INVENTION

A method of providing adaptive modulation and coding in a multi-carrier wireless network that includes a plurality of subscriber stations is provided. According to an advantageous embodiment of the present disclosure, the method includes, for each of the subscriber stations, selecting a type of modulation and a coding rate based on a signal-to-interference-plus-noise ratio (SINR) variance.

According to another embodiment of the present disclosure, a method of providing adaptive modulation and coding in a multi-carrier wireless network that includes a plurality of subscriber stations is provided. The method includes, for each of the subscriber stations, selecting a type of modulation and a coding rate based on a transmission mode for the subscriber station.

According to yet another embodiment of the present disclosure, a base station capable of providing adaptive modulation and coding for a plurality of subscriber stations in a multi-carrier wireless network is provided. The base station includes an adaptive modulation and coding (AMC) unit that is operable, for each of the subscriber stations, to select a type of modulation and a coding rate based on an SINR variance.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A-B illustrate the impact of frequency, time and space variations in a signal-to-interference-plus-noise ratio (SINR) on achievable channel capacity according to an embodiment of the present disclosure;

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
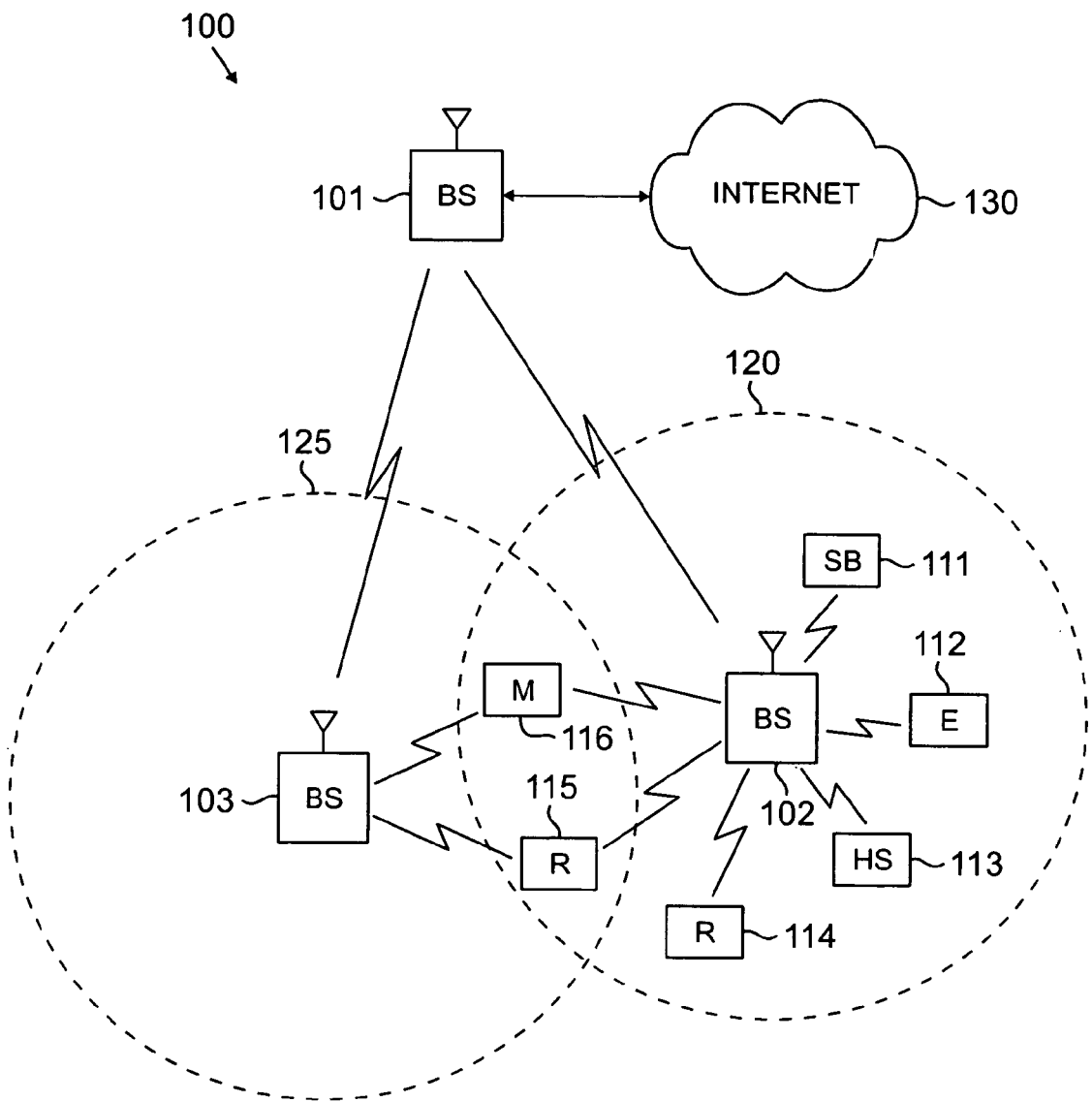
FIG. 1 illustrates an orthogonal frequency division multiplexing (OFDM) wireless network that is capable of providing adaptive modulation and coding according to an embodiment of the present disclosure.

FIG. 1 illustrates an OFDM wireless network 100 that is capable of providing adaptive modulation and coding according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively, In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

As described in more detail below, for a particular embodiment, any one or more of base stations 101, 102 and 103 is operable to provide adaptive modulation and coding for subscriber stations 111-116 based on variations in signal-to-interference-plus-noise ratios (SINR) due to differences in frequency, time and/or space. For some embodiments, subscriber stations 111-116 may be operable to determine SINR variations and provide the SINR variations to a corresponding base station 101-103. For other embodiments, base stations 101-103 may be operable to estimate SINR variations based on uplink measurements. Based on either received SINR variations or estimated SINR variations, base stations 101-103 are operable to select modulation and coding rates for subscriber stations 111-116.

Figure 2A:
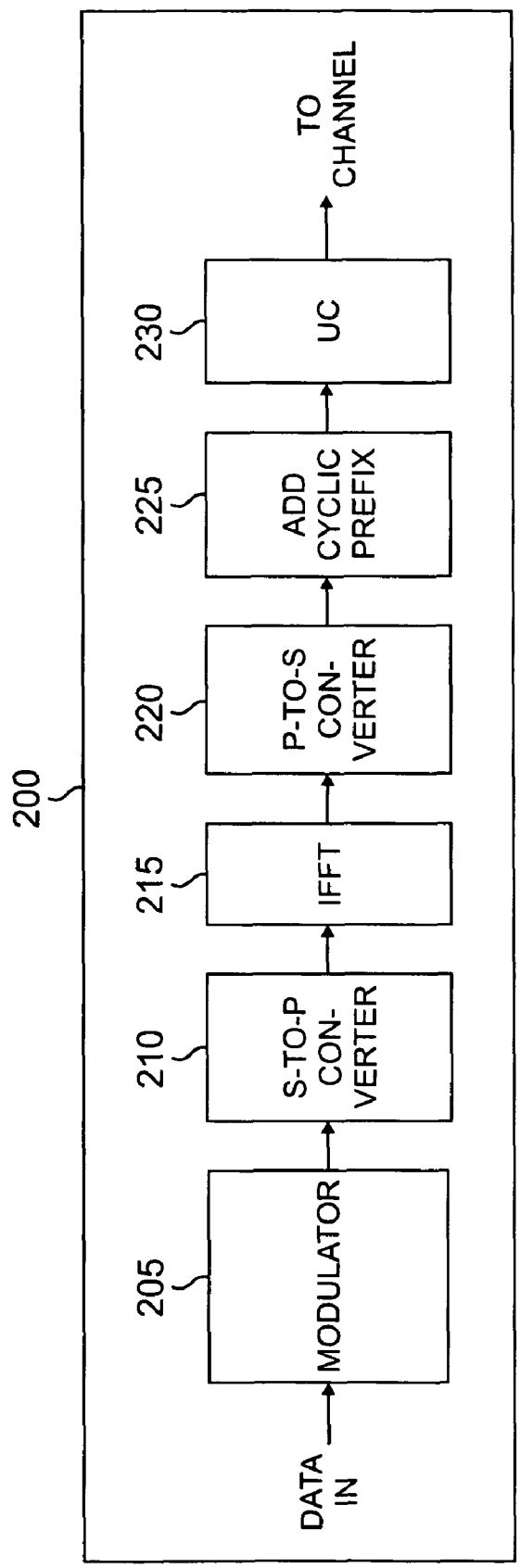
FIGS. 2A-B are block diagrams of an orthogonal frequency division multiple access (OFDMA) transmitter and an OFDMA receiver, respectively, according to an embodiment of the disclosure.
Figure 2B:
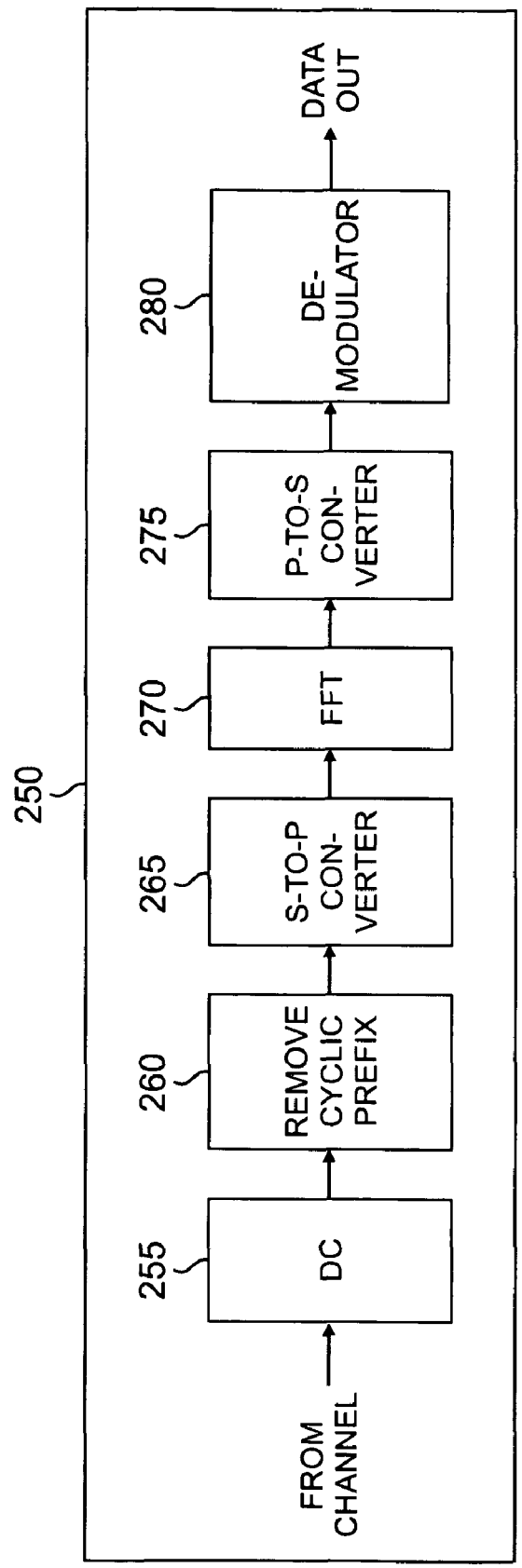

FIG. 2A is a block diagram of orthogonal frequency division multiple access (OFDMA) transmitter 200. FIG. 2B is a block diagram of OFDMA receiver 250. OFDMA transmitter 200 or OFDMA receiver 250, or both, may be implemented in any of base stations 101-103 of wireless network 100. Similarly, OFDMA transmitter 200 or OFDMA receiver 250, or both, may be implemented in any of subscriber stations 111-116 of wireless network 100.

OFDMA transmitter 200 comprises a modulator 205, a serial-to-parallel (S-to-P) converter 210, an Inverse Fast Fourier Transform (IFFT) block 215, a parallel-to-serial (P-to-S) converter 220, an add cyclic prefix block 225, and an up-converter (UC) 230. OFDMA receiver 250 comprises a down-converter (DC) 255, a remove cyclic prefix block 260, a serial-to-parallel (S-to-P) converter 265, a Fast Fourier Transform (FFT) block 270, a parallel-to-serial (P-to-S) converter 275, and a demodulator 280. For one embodiment, modulator 205 comprises a quadrature amplitude modulation (QAM) modulator and demodulator 280 comprises a QAM demodulator.

At least some of the components in FIGS. 2A and 2B may be implemented in software while other components may be implemented by configurable hardware or a mixture of software and configurable hardware. In particular, it is noted that the IFFT block 215 and the FFT block 270 described in this disclosure may be implemented as configurable software algorithms. These blocks 215 and 270 may each have a corresponding size of N and the value of N may be modified according to the implementation.

Furthermore, although the present disclosure is directed to an embodiment that implements the Fast Fourier Transform and the Inverse Fast Fourier Transform, this is by way of illustration only and should not be construed so as to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of N may be any integer number (i.e., 1, 2, 3, 4, etc.), while for FFT and IFFT functions, the value of N may be any integer number that is a power of two (i.e., 1, 2, 4, 8, 16, etc.).

In OFDMA transmitter 200 for one embodiment, modulator 205 receives a set of information bits and modulates the input bits to produce a sequence of frequency-domain modulation symbols. Modulator 205 modulates the input bits using modulation and coding that are selected based on SINR variance, as described in more detail below. Serial-to-parallel converter 210 converts (e.g., de-multiplexes) the serial symbols to parallel data, thereby producing N parallel symbol streams (where N is the IFFT/FFT size used in transmitter 200 and receiver 250). IFFT block 215 then performs an IFFT operation on the N parallel symbol streams to produce time-domain output signals. Parallel-to-serial converter 220 converts (e.g., multiplexes) the parallel time-domain output symbols from IFFT block 215 to produce a serial time-domain signal. Add cyclic prefix block 225 then adds a cyclic prefix onto the time-domain signal.

Finally, up-converter 230 up-converts the output of add cyclic prefix block 225 to RF frequency for transmission via the forward channel or reverse channel, depending on whether OFDMA transmitter 200 is implemented in a base station or a subscriber station. The signal from add cyclic prefix block 225 may also be filtered at baseband before conversion to RF frequency. The time-domain signal transmitted by OFDMA transmitter 200 comprises multiple overlapping sinusoidal signals corresponding to the data symbols transmitted.

In OFDMA receiver 250, an incoming RF signal is received from the forward channel or reverse channel, depending on whether OFDMA receiver 250 is implemented in a subscriber station or a base station. OFDMA receiver 250 reverses the operations performed in OFDMA transmitter 200. Down-converter 255 down-converts the received signal to baseband frequency and remove cyclic prefix block 260 removes the cyclic prefix to produce the serial time-domain baseband signal. Serial-to-parallel converter 265 converts the time-domain baseband signal to parallel time-domain signals. FFT block 270 then performs an FFT algorithm to produce N parallel frequency-domain signals. Parallel-to-serial converter 275 converts the parallel frequency-domain signals to a sequence of data symbols. Demodulator 280 then demodulates the symbols to recover the original input data stream.

Figure 3A:
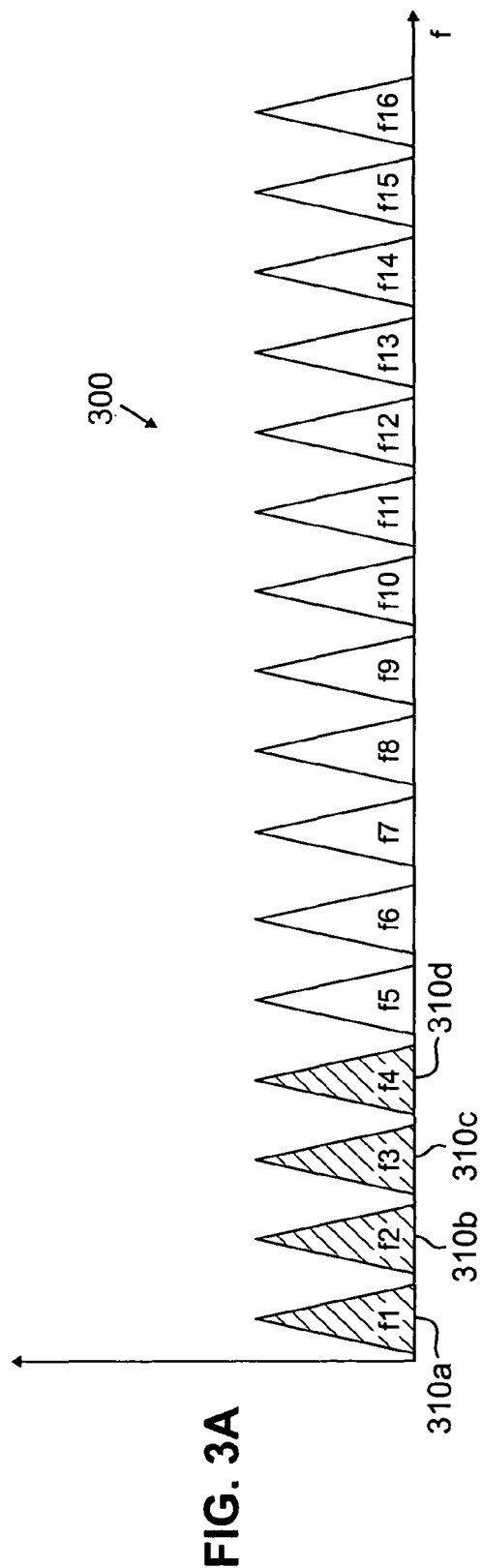
FIGS. 3A-B illustrate sub-carrier allocation for the subscriber stations of FIG. 1 according to two embodiments of the present disclosure.
Figure 3B:
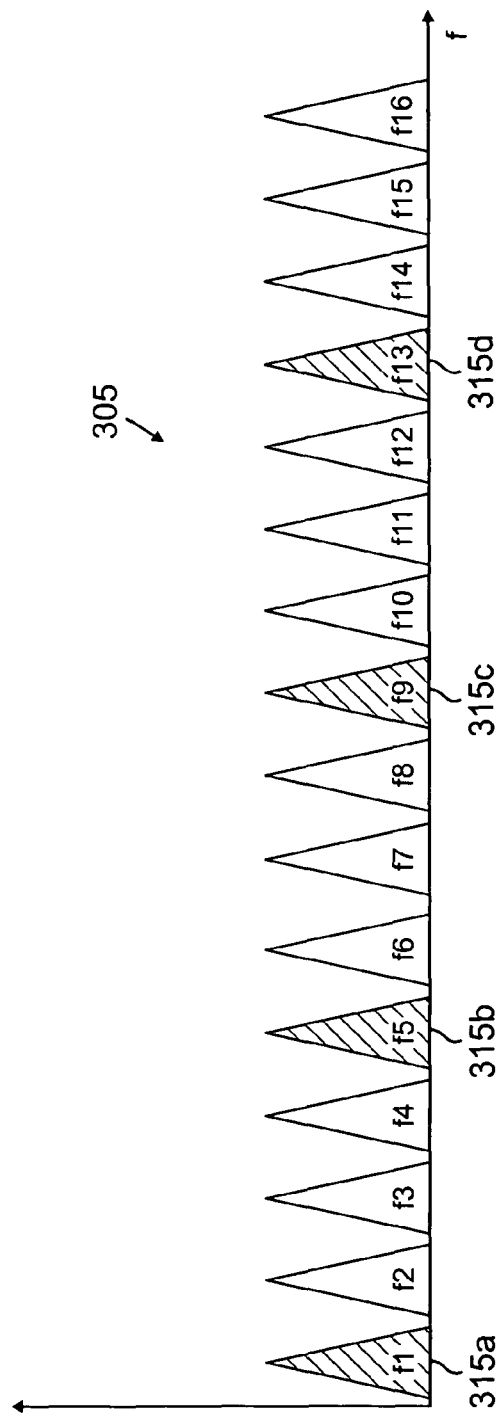

FIG. 3A illustrates sub-carrier allocation for frequency-selective multi-user scheduling 300, and FIG. 3B illustrates sub-carrier allocation for frequency diversity in OFDM 305. In the case of frequency-selective multi-user scheduling 300, a contiguous set of sub-carriers 310a-d potentially experiencing an upfade is allocated for transmission to a user. The total bandwidth is divided into subbands grouping multiple contiguous sub-carriers, as shown in FIG. 3A where sub-carriers $f_1$, $f_2$, $f_3$ and $f_4$ 310a-d are grouped into a subband for transmission to a user in frequency-selective multi-user scheduling mode. However, in the case of frequency-diversity transmission 305, the allocated sub-carriers 315a-d are preferably uniformly distributed over the whole spectrum, as is shown in FIG. 3B.

The frequency-selective multi-user scheduling 300 is generally beneficial for low mobility users for which the channel quality can be tracked. However, the channel quality can generally not be tracked for high mobility users (particularly in a frequency division duplexing system where the fading between the downlink and uplink is independent) due to channel quality feedback delays. Thus, for high mobility users, the frequency diversity transmission mode 305 may be preferred.

Figure 4A:
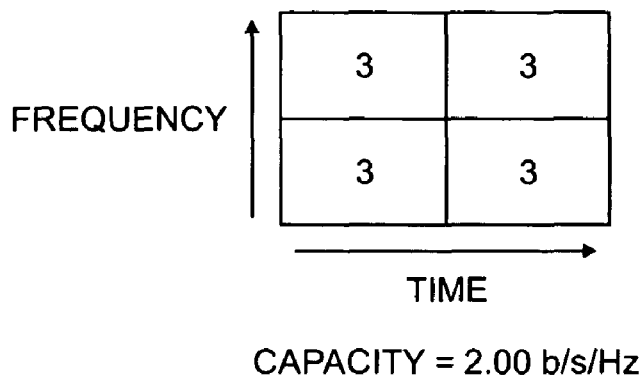
FIGS. 4A-C illustrate the impact of frequency and time variations in a signal-to-noise ratio (SNR) on achievable channel capacity according to an embodiment of the present disclosure.
Figure 4B:
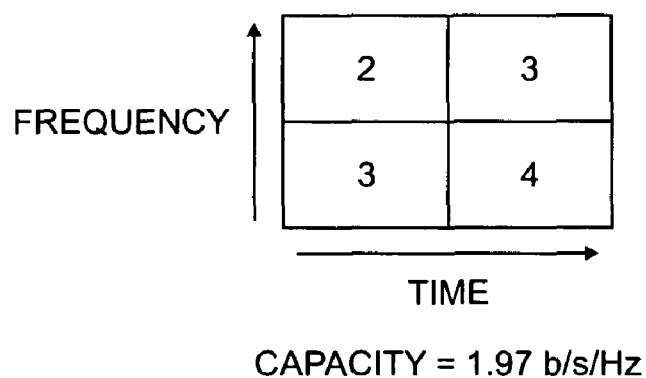
Figure 4C:
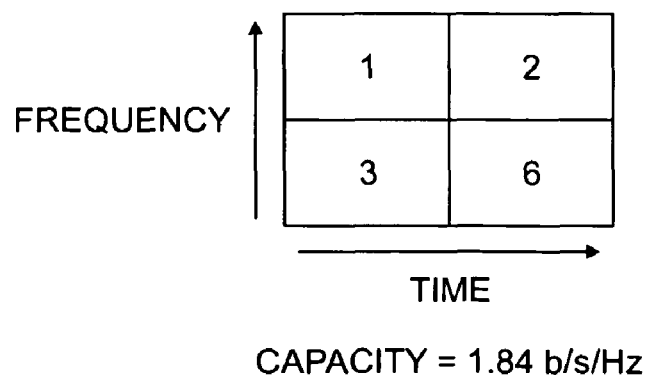

FIGS. 4A-C illustrate the impact of frequency and time variations in a signal-to-noise ratio (SNR) on achievable channel capacity according to an embodiment of the present disclosure. For this embodiment, four modulation symbols corresponding to an information block are transmitted over frequency and time. The achievable channel capacity is dependent on the frequency and time variations in a frequency-time grid over which the symbols are transmitted. The SNR variation in the frequency domain generally occurs due to channel multi-path delay spread, while the time variations are the result of Doppler effects caused by mobility.

For the illustrated embodiment, the mean SNR during block transmission over the frequency-time grid is 3. However, the frequency and time variations are different for each case. For FIG. 4A, no variation exists. For FIG. 4B, slight variation exists. For FIG. 4C, even more variation exists. The capacity for each of the three cases (FIGS. 4A-C) may be calculated using the Shannon capacity formula, as follows:

$$C_1=[\log_2(1+3)+\log_2(1+3)+\log_2(1+3)+\log_2(1+3)]/4=2.00 \text{ b/s/Hz}$$

$$C_2=[\log_2(1+2)+\log_2(1+3)+\log_2(1+3)+\log_2(1+4)]/4=1.97 \text{ b/s/Hz}$$

$$C_3=[\log_2(1+1)+\log_2(1+2)+\log_2(1+3)+\log_2(1+6)]/4=1.84 \text{ b/s/Hz}.$$

Thus, the highest capacity is achieved for the first case (corresponding to FIG. 4A), where the SNR is constant over the block transmission frequency-time grid. The achievable capacity decreases as the SNR variations within the frequency-time grid of block transmission increase.

FIGS. 5A-B illustrate the impact of frequency, time and space variations in a signal-to-interference-plus-noise ratio (SINR) on achievable channel capacity according to an embodiment of the present disclosure. In a cellular wireless system such as network 100, in addition to background noise, interference from neighboring cells degrades the signal quality. Therefore, the capacity in cellular systems is generally determined based on the SINR, instead of the SNR. Variations in SINR may occur due to bursty interference in neighboring cells, in addition to time and frequency fading of the channel. The variations in SINR within a block transmission affect the achievable capacity in a manner similar to the variation in SNR, as described above in connection with FIGS. 4A-C. In addition to time and frequency variations, signal quality may also vary across antennas or beams when an information block is transmitted over multiple transmit antennas or beams.

For this embodiment, eight modulation symbols corresponding to an information block are transmitted over frequency, time and space. The achievable channel capacity is dependent on the frequency, time and space variations in a frequency-time-space grid over which the symbols are transmitted.

For the illustrated embodiment, the mean SINR during block transmission over the frequency-time grid is 3. However, the frequency, time and space variations are different for each case. For this embodiment, space variations are due to transmissions from different antennas (antenna 1 and antenna 2). For FIG. 5A, no variation exists. For FIG. 5B, slight variation exists for antenna 1 and more variation exists for antenna 2.

As with SNR, the highest capacity is achieved for the first case (corresponding to FIG. 5A), where the SINR is constant over the block transmission frequency-time-space grid. The achievable capacity decreases as the SINR variations within the frequency-time-space grid of block transmission increase.

The achievable capacity is not directly related with the average SNR. A more accurate measure of channel quality may be a derived SINR based on achievable capacity. For example, the effective SINR for the two cases illustrated in FIGS. 5A and 5B may be written as:

$$SINR_{\mathit{eff1}}=2^{C_1}-1=2^2-1=4-1=3$$

$$SINR_{\mathit{eff2}}=2^{C_2}-1=2^{1.75}-1=3.36-1=2.36,$$

where C1 and C2 are the achievable capacities in b/s/Hz/antenna for case 1 in FIG. 5A and case 2 in FIG. 5B, respectively, and $SINR_{\mathit{eff1}}$ and $SINR_{\mathit{eff2}}$ are the effective SINR values for case 1 and case 2, respectively. Even though the average SINR is the same in both cases, the achievable capacity in case 1 is larger than the achievable capacity in case 2. Because effective SINR may be directly translated into achievable capacity, effective SINR represents a more accurate measure of the channel quality.

Figure 6:
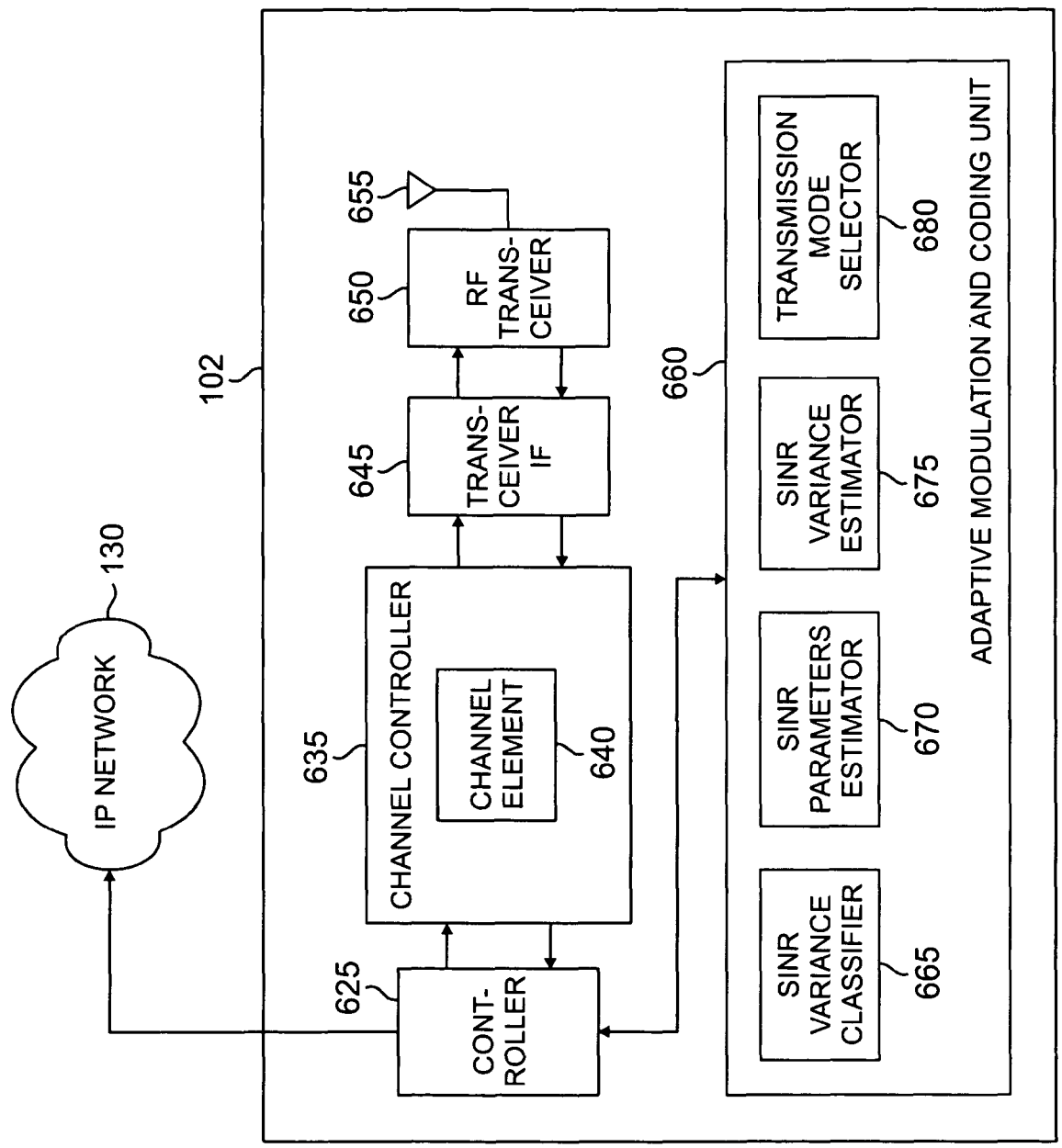
FIG. 6 illustrates a base station that is capable of providing adaptive modulation and coding in the network of FIG. 1 according to an embodiment of the present disclosure.

FIG. 6 illustrates base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 625, channel controller 635, transceiver interface (IF) 645, radio frequency (RF) transceiver unit 650, antenna array 655 and adaptive modulation and coding (AMC) unit 660.

Controller 625 comprises processing circuitry and memory capable of executing an operating program that controls the overall operation of base station 102. In an embodiment, controller 625 may be operable to communicate with network 130. Under normal conditions, controller 625 directs the operation of channel controller 635, which comprises a number of channel elements, such as exemplary channel element 640, each of which performs bi-directional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 640 also preferably performs all baseband processing, including processing any digitized received signal to extract the information or data bits conveyed in the received signal, typically including demodulation, decoding, and error correction operations, as known to those of skill in the art. Transceiver IF 645 transfers bi-directional channel signals between channel controller 635 and RF transceiver unit 650.

Antenna array 655 transmits forward channel signals received from RF transceiver unit 650 to subscriber stations 111-116 in the coverage area of base station 102. Antenna array 655 is also operable to send to RF transceiver unit 650 reverse channel signals received from subscriber stations 111-116 in the coverage area of the base station 102. According to one embodiment of the present disclosure, antenna array 655 comprises a multi-sector antenna, such as a three-sector antenna in which each antenna sector is responsible for transmitting and receiving in a coverage area corresponding to an arc of approximately 120 degrees. Additionally, RF transceiver unit 650 may comprise an antenna selection unit to select among different antennas in antenna array 655 during both transmit and receive operations.

AMC unit 660 may comprise one or more of SINR variance classifier 665, SINR parameters estimator 670, SINR variance estimator 675 and transmission mode selector 680. In accordance with an embodiment of the present disclosure, AMC unit 660 may comprise (i) SINR variance classifier 665 or (ii) SINR variance classifier 665, SINR parameters estimator 670 and SINR variance estimator 675 or (iii) transmission mode selector 680. However, it will be understood that any suitable combination of these components 665, 670, 675 and 680 may be implemented in AMC unit 660.

In addition, although illustrated and described as four separate components, it will be understood that any two or more of SINR variance classifier 665, SINR parameters estimator 670, SINR variance estimator 675 and transmission mode selector 680 may be implemented together in a single component without departing from the scope of the present disclosure. For example, for some embodiments, SINR variance classifier 665, SINR parameters estimator 670 and SINR variance estimator 675 or SINR parameters estimator 670 and SINR variance estimator 675 may be implemented as a single component.

SINR variance classifier 665 is operable to classify SINR variances of subscriber stations 111-116 for base station 102. For example, base station 102 may receive SINR variance data from subscriber stations 111-116 and, based on that data, SINR variance classifier 665 may classify the SINR variance for each subscriber station 111-116. Alternatively, as described below, AMC unit 660 may estimate SINR variances for subscriber stations 111-116 using SINR parameters estimator 670 and SINR variance estimator 675. Based on the estimated SINR variances, SINR variance classifier 665 may classify the SINR variance for each subscriber station 111-116.

SINR variance classifier 665 is operable to classify the SINR variance for subscriber stations 111-116 according to any suitable classification system. For example, for one embodiment, SINR variance classifier 665 is operable to classify each SINR variance as either low or high based on whether the SINR variance is below or above a predefined boundary.

The symbol SINR variance within a block transmission time is generally a function of the subscriber station speed, channel delay spread, and the like. In the case of a block transmission over multiple antennas or beams, the symbol SINR is also a function of the antenna or beam correlation. The subscriber station speed, delay spread or antenna correlation generally changes relatively slowly over time. Therefore, for the embodiment in which base station 102 receives SINR variance data from subscriber stations 111-116, the SINR variance data may be received at a slower rate than the mean or effective SINR.

For some embodiments, channel quality indication (CQI) feedback is received at twice the rate of SINR variance feedback. For a particular embodiment, subscriber station 111-116 provides CQI feedback in CQI messages and SINR variance feedback in SINR variance messages. For another embodiment, subscriber station 111-116 provides both CQI feedback and SINR variance feedback in CQI messages, with the SINR variance feedback included in half the CQI messages.

The above-described CQI and SINR variance feedback mechanism may be implemented in a frequency division duplexing (FDD) system. For another embodiment implemented in a time division duplexing (TDD) system, the CQI and SINR variance may be measured at base station 102 from, for example, uplink pilot or reference signal transmission. It is also possible that a plurality of SINR parameters, such as Doppler, delay spread and antenna correlation, may be estimated at base station 102. For this embodiment, SINR parameters estimator 670 is operable to estimate the SINR parameters based on uplink measurements. SINR variance estimator 675 is operable to estimate SINR variance for each of the subscriber stations 111-116 based on one or more of the SINR parameters estimated by SINR parameters estimator 670.

In addition to the SINR variance as described above for providing a measure of frequency, time and spatial selectivity in the channel, other types of SINR variance may be used in modulation and coding rate selection. For one example, standard deviation of SINR may be used. For another example, the difference between the mean SINR and the effective SINR within a block transmission frequency-time-space grid, which corresponds to the SINR variance, may be used. For this example, subscriber stations 111-116 may either provide the difference to base station 102 or provide the mean and effective SINR values to base station 102, allowing base station 102 to determine the difference. Alternatively, base station 102 may estimate the mean and effective SINR values based on the uplink measurements. In addition, as described below, SINR variance is related to transmission modes, which may be used to select modulation and coding rates based on SINR variance indirectly.

For this embodiment, transmission mode selector 680 is operable to select a transmission mode for each subscriber station 111-116. For example, transmission mode selector 680 may be operable to select a transmission mode of either localized or distributed. In localized transmission mode, a contiguous or localized set of subcarriers is allocated for transmission, such as illustrated in FIG. 3A as frequency-selective multi-user scheduling 300. In distributed transmission mode, a distributed set of subcarriers is allocated for block transmission, such as illustrated in FIG. 3B as frequency diversity scheduling 305. Thus, for one embodiment, transmission mode selector 680 may be operable to select a transmission mode for a subscriber station 111-116 based on the speed of the subscriber station 111-116, with localized corresponding to slower subscriber stations 111-116 and distributed corresponding to faster subscriber stations 111-116.

Using a transmission mode selected by transmission mode selector 680, AMC unit 660 may provide modulation and coding based on SINR variance. This is because, in general, the SINR variance is lower for localized transmission and higher for distributed transmission. The SINR variance for localized transmission is lower because the transmission generally takes place over a narrowband. On the other hand, distributed transmission occurs over a larger bandwidth. Therefore, for a given coherence bandwidth, frequency selectivity is higher in the case of distributed transmission relative to localized transmission. The larger frequency selectivity in distributed transmission results in larger SINR variance.

Using the SINR variance classification provided by SINR variance classifier 665 or the transmission mode selected by transmission mode selector 680, AMC unit 660 is operable to select modulation and coding for each subscriber station 111-116 in the coverage area of base station 102 based on SINR variance, in addition to any other suitable criteria such as mean SINR and the like. In this way, use of coding rate and modulation under various channel conditions is optimized, resulting in improved link efficiency and wireless system performance.

For a particular embodiment, AMC unit 660 is operable to determine the coding rate based on the following equation:

$$CR = \frac{B}{\log_2 M \times N_{symb}},$$

where B is the information block size in bits, M is the modulation order, and $N_{symb}$ is the available modulation symbols to transmit the B bits. For example, the modulation order is 2 for BPSK, 4 for QPSK, and 16 for 16-QAM.

AMC unit 660 may use a coding rate threshold to determine when to switch to a different order modulation. For example, in some cases, a rate ⅓ 16-QAM transmission may be advantageous over a coding rate ⅔ QPSK transmission, even though both carry the same number of information bits.

For some embodiments, AMC unit 660 may also be operable to select one coding rate threshold from multiple coding rate thresholds for use in determining when to switch to a different order modulation. For example, for a particular embodiment, a higher coding rate threshold may be used when the SINR variance is lower, and a lower coding rate threshold may be used when the SINR variance is higher. In this situation, when the SINR variance is higher, switching to a higher order modulation will take place at a lower coding rate relative to the case of a lower SINR variance.

Figure 7:
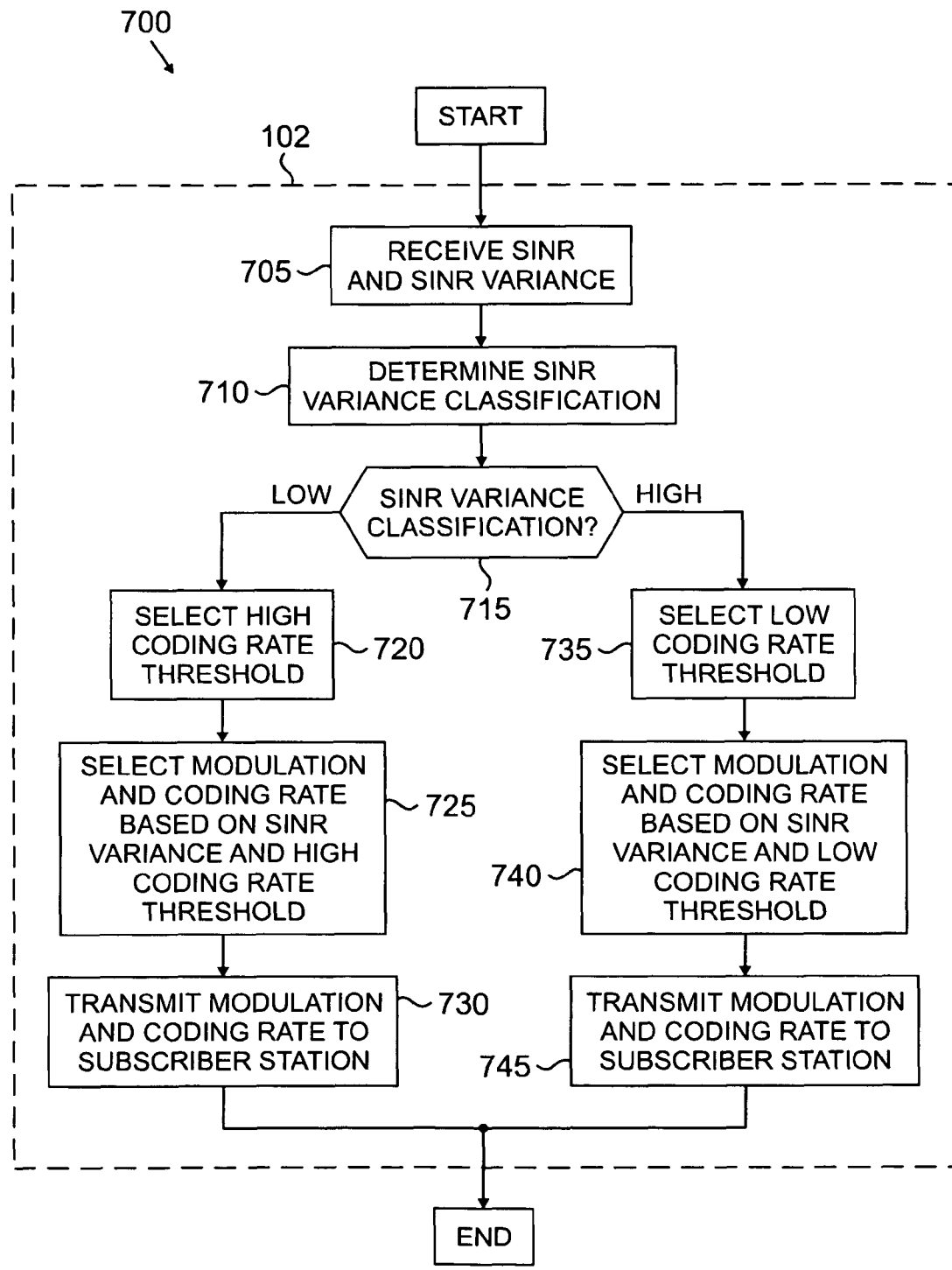
FIG. 7 is a flow diagram illustrating a method for providing adaptive modulation and coding using the base station of FIG. 6 according to an embodiment of the present disclosure.

FIG. 7 is a flow diagram illustrating a method 700 for providing adaptive modulation and coding using base station 102 according to an embodiment of the present disclosure. Although the method 700 is described with respect to base station 102, it will be understood that the method 700 may be performed by any suitable base station in network 100, such as base station 103. In addition, the method 700 is described with respect to a single subscriber station 111. Thus, it will be understood that the method 700 may be performed for each subscriber station 111-116 within the coverage area of base station 102.

Initially, AMC unit 660 receives SINR data, such as a mean SINR, an effective SINR and/or the like, and SINR variance data from subscriber station 111 (process step 705). For a particular embodiment, subscriber station 111 sends the SINR variance data to base station 102 within a CQI message. For another embodiment, subscriber station 111 sends a separate SINR variance message to base station 102. For some embodiments, base station 102 receives CQI data at a rate that is twice the rate of received SINR variance data.

SINR variance classifier 665 determines the SINR variance classification for subscriber station 111 based on the received SINR variance data (process step 710). For a particular embodiment, SINR variance classifier 665 classifies the SINR variance data by comparing the SINR variance data to a predefined boundary. For this embodiment, SINR variance classifier 665 classifies the SINR variance as low when it is below the boundary and high when it is above the boundary.

AMC unit 660 determines whether the SINR variance classification provided by SINR variance classifier 665 is low or high (process step 715). If the SINR variance classification is low (process step 715), AMC unit 660 may optionally select a high coding rate threshold for use in modulation and coding rate selection (optional process step 720). Otherwise, no selection is made and AMC unit 660 uses a single coding rate threshold.

AMC unit 660 then selects a modulation and coding rate for subscriber station 111 based on the low SINR variance and, if used, the high coding rate threshold (process step 725). Because the SINR variance is classified as low, AMC unit 660 selects a lower order modulation with a weaker coding rate. If the optional high coding rate threshold is used, switching to a higher order modulation takes place at a higher coding rate relative to the case in which the SINR variance is classified as high. Base station 102 then transmits the data using the selected modulation and coding rate to subscriber station 111 (process step 730), after which the method comes to an end.

If the SINR variance classification is high (process step 715), AMC unit 660 may optionally select a low coding rate threshold for use in modulation and coding rate selection (optional process step 735). Otherwise, no selection is made and AMC unit 660 uses a single coding rate threshold.

AMC unit 660 then selects a modulation and coding rate for subscriber station 111 based on the high SINR variance and, if used, the low coding rate threshold (process step 740). Because the SINR variance is classified as high, AMC unit 660 selects a higher order modulation with a stronger coding rate. If the optional low coding rate threshold is used, switching to a lower order modulation takes place at a lower coding rate relative to the case in which the SINR variance is classified as low. Base station 102 then transmits the selected modulation and coding rate to subscriber station 111 (process step 745), after which the method comes to an end.

Figure 8:
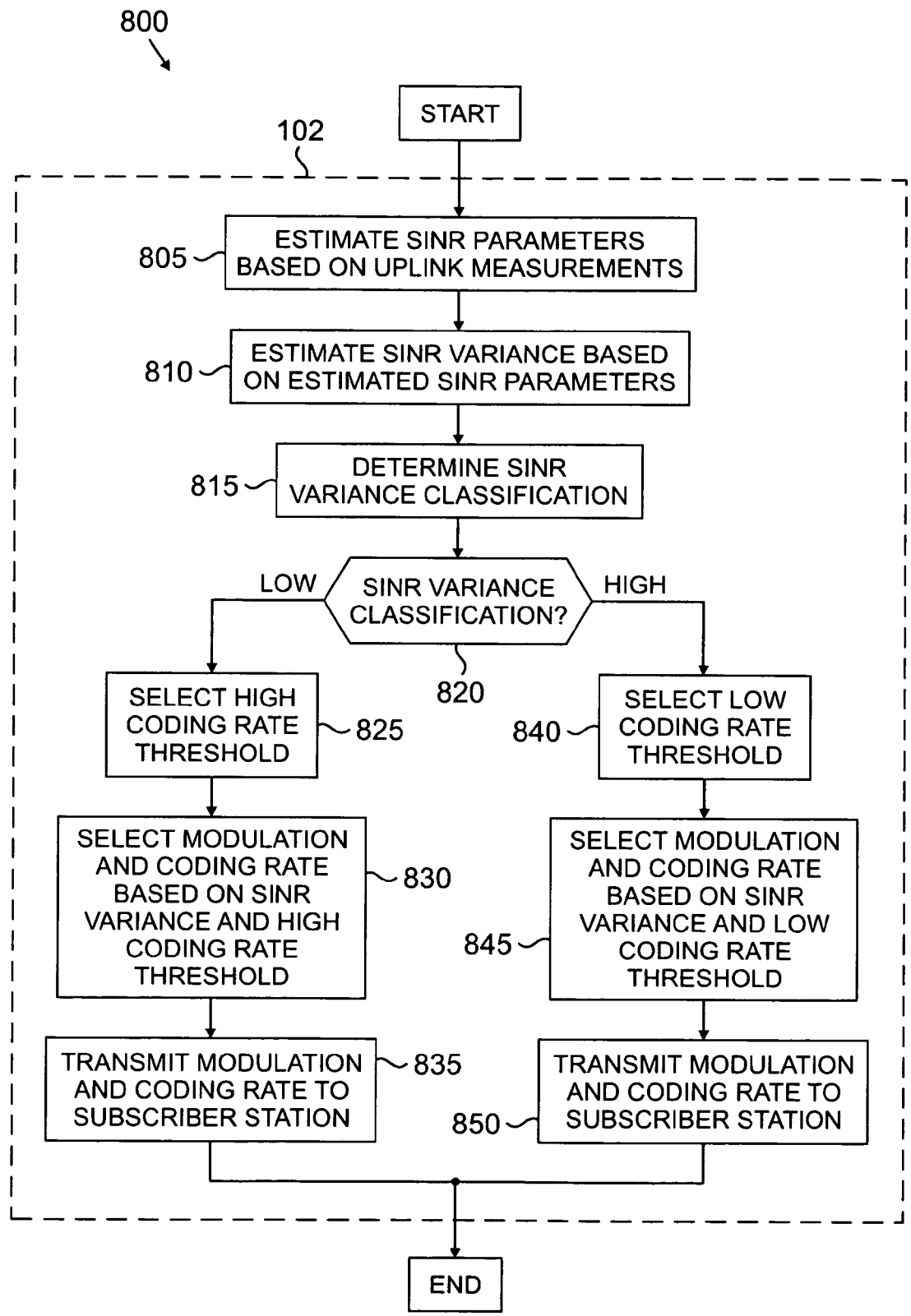
FIG. 8 is a flow diagram illustrating a method for providing adaptive modulation and coding using the base station of FIG. 6 according to another embodiment of the present disclosure.

FIG. 8 is a flow diagram illustrating a method 800 for providing adaptive modulation and coding using base station 102 according to another embodiment of the present disclosure. Although the method 800 is described with respect to base station 102, it will be understood that the method 800 may be performed by any suitable base station in network 100, such as base station 103. In addition, the method 800 is described with respect to a single subscriber station 111. Thus, it will be understood that the method 800 may be performed for each subscriber station 111-116 within the coverage area of base station 102.

Initially, SINR parameters estimator 670 estimates SINR parameters based on uplink measurements (process step 805). For a particular embodiment, SINR parameters estimator 670 estimates Doppler, delay spread and antenna correlation. SINR variance estimator 675 then estimates SINR variance based on the estimated SINR parameters (process step 810).

SINR variance classifier 665 determines the SINR variance classification for subscriber station 111 based on the estimated SINR variance (process step 815). For a particular embodiment, SINR variance classifier 665 classifies the estimated SINR variance by comparing the estimated SINR variance to a predefined boundary. For this embodiment, SINR variance classifier 665 classifies the estimated SINR variance as low when it is below the boundary and high when it is above the boundary.

AMC unit 660 determines whether the SINR variance classification provided by SINR variance classifier 665 is low or high (process step 820). If the SINR variance classification is low (process step 820), AMC unit 660 may optionally select a high coding rate threshold for use in modulation and coding rate selection (optional process step 825). Otherwise, no selection is made and AMC unit 660 uses a single coding rate threshold.

AMC unit 660 then selects a modulation and coding rate for subscriber station 111 based on the low SINR variance and, if used, the high coding rate threshold (process step 830). Because the SINR variance is classified as low, AMC unit 660 selects a lower order modulation with a weaker coding rate. If the optional high coding rate threshold is used, switching to a higher order modulation takes place at a higher coding rate relative to the case in which the SINR variance is classified as high. Base station 102 then transmits the data using the selected modulation and coding rate to subscriber station 111 (process step 835), after which the method comes to an end.

If the SINR variance classification is high (process step 820), AMC unit 660 may optionally select a low coding rate threshold for use in modulation and coding rate selection (optional process step 840). Otherwise, no selection is made and AMC unit 660 uses a single coding rate threshold.

AMC unit 660 then selects a modulation and coding rate for subscriber station 111 based on the high SINR variance and, if used, the low coding rate threshold (process step 845). Because the SINR variance is classified as high, AMC unit 660 selects a higher order modulation with a stronger coding rate. If the optional low coding rate threshold is used, switching to a lower order modulation takes place at a lower coding rate relative to the case in which the SINR variance is classified as low. Base station 102 then transmits the data using the selected modulation and coding rate to subscriber station 111 (process step 850), after which the method comes to an end.

Figure 9:
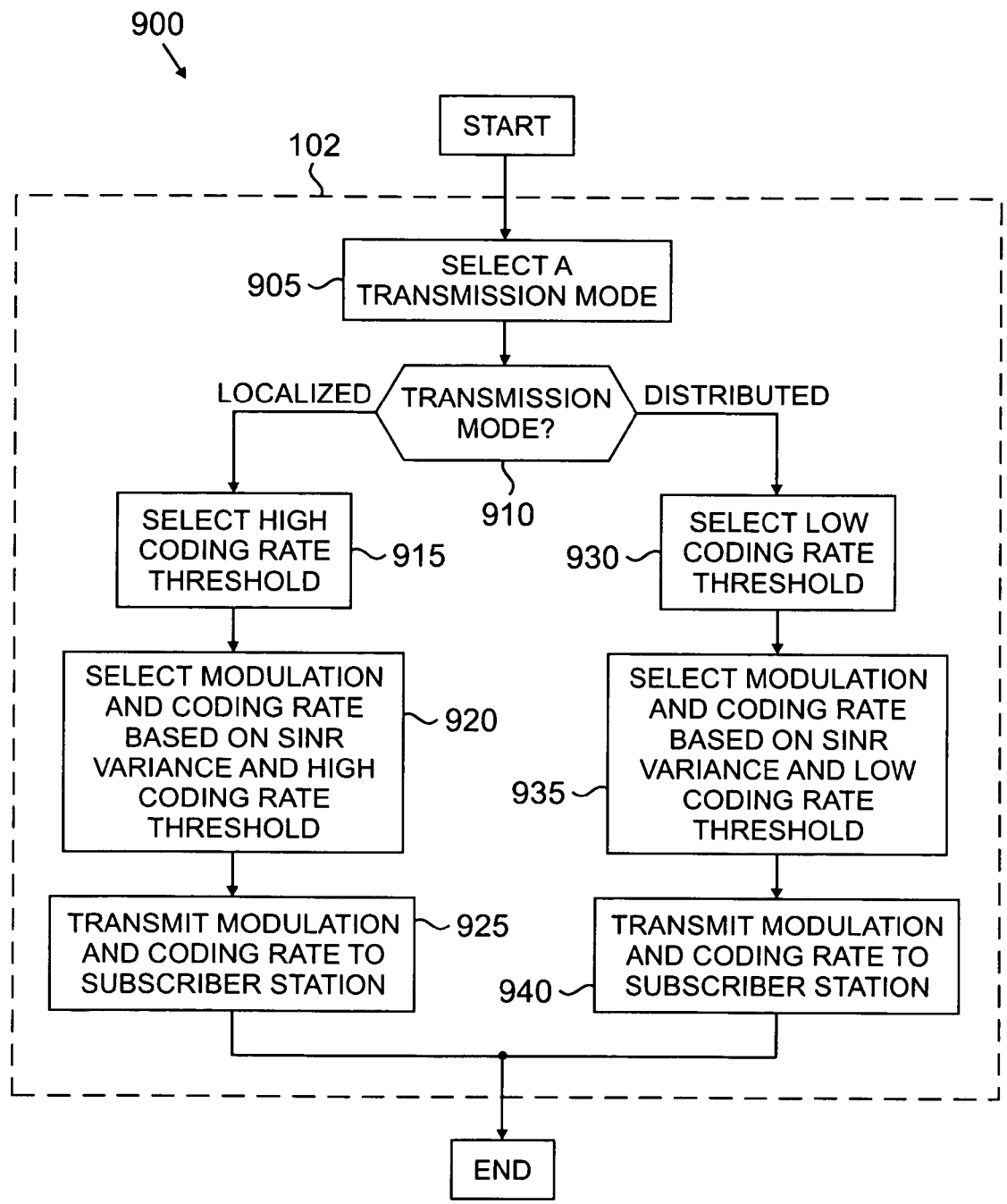
FIG. 9 is a flow diagram illustrating a method for providing adaptive modulation and coding using the base station of FIG. 6 according to yet another embodiment of the present disclosure.

FIG. 9 is a flow diagram illustrating a method 900 for providing adaptive modulation and coding using base station 102 according to yet another embodiment of the present disclosure. Although the method 900 is described with respect to base station 102, it will be understood that the method 900 may be performed by any suitable base station in network 100, such as base station 103. In addition, the method 900 is described with respect to a single subscriber station 111. Thus, it will be understood that the method 900 may be performed for each subscriber station 111-116 within the coverage area of base station 102.

Initially, transmission mode selector 680 selects a transmission mode for subscriber station 111 (process step 905). For this embodiment, transmission mode selector 680 selects either a localized transmission mode or a distributed transmission mode. For one embodiment, the transmission mode is selected based on the speed of subscriber station 111.

If transmission mode selector 680 selects the localized transmission mode (process step 910), the SINR variance is relatively low and AMC unit 660 may optionally select a high coding rate threshold for use in modulation and coding rate selection (optional process step 915). Otherwise, no selection is made and AMC unit 660 uses a single coding rate threshold.

AMC unit 660 then selects a modulation and coding rate for subscriber station 111 based on the low SINR variance and, if used, the high coding rate threshold (process step 920). Because the SINR variance for localized transmission mode is low, AMC unit 660 selects a lower order modulation with a weaker coding rate. If the optional high coding rate threshold is used, switching to a higher order modulation takes place at a higher coding rate relative to the case in which the SINR variance is high. Base station 102 then transmits the data using the selected modulation and coding rate to subscriber station 111 (process step 925), after which the method comes to an end.

If transmission mode selector 680 selects the distributed transmission mode (process step 910), the SINR variance is relatively high and AMC unit 660 may optionally select a low coding rate threshold for use in modulation and coding rate selection (optional process step 930). Otherwise, no selection is made and AMC unit 660 uses a single coding rate threshold.

AMC unit 660 then selects a modulation and coding rate for subscriber station 111 based on the high SINR variance and, if used, the low coding rate threshold (process step 935). Because the SINR variance for distributed transmission mode is high, AMC unit 660 selects a higher order modulation with a stronger coding rate. If the optional low coding rate threshold is used, switching to a lower order modulation takes place at a lower coding rate relative to the case in which the SINR variance is low. Base station 102 then transmits the data using the selected modulation and coding rate to subscriber station 111 (process step 940), after which the method comes to an end.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing adaptive modulation and coding in a multi-carrier wireless network comprising a plurality of subscriber stations, comprising:
    for each of the subscriber stations, receiving a signal-to-interference-plus-noise (SINR) variance from the subscriber station; and
    for each of the subscriber stations, selecting a type of modulation and a coding rate based on the SINR variance.

2. The method as set forth in claim 1, selecting a type of modulation and a coding rate based on the SINR variance comprising selecting a type of modulation and a coding rate based on a standard deviation of the SINR.

3. The method as set forth in claim 1, selecting a type of modulation and a coding rate based on the SINR variance comprising selecting a type of modulation and a coding rate based on a difference between a mean SINR and an effective SINR.

4. The method as set forth in claim 1, selecting a type of modulation and a coding rate based on the SINR variance comprising selecting a type of modulation and a coding rate based on a transmission mode for the subscriber station.

5. The method as set forth in claim 1, further comprising, for each of the subscriber stations, classifying the SINR variance as one of low and high.

6. The method as set forth in claim 5, further comprising, for each of the subscriber stations, selecting a high coding rate threshold when the SINR variance is classified as low and selecting a low coding rate threshold when the SINR variance is classified as high.

7. The method as set forth in claim 1, further comprising, for each of the subscriber stations, selecting a coding rate threshold based on the SINR variance.

8. The method as set forth in claim 1, further comprising, for each of the subscriber stations, estimating the SINR variance based on at least one SINR parameter.

9. The method as set forth in claim 8, the at least one SINR parameter comprising at least one of Doppler, delay spread and antenna correlation.

10. The method as set forth in claim 8, further comprising, for each of the subscriber stations, estimating the at least one SINR parameter based on uplink measurements.

11. A method of providing adaptive modulation and coding in a multi-carrier wireless network comprising a plurality of subscriber stations, comprising:
    for each of the subscriber stations, selecting a type of modulation and a coding rate based on a transmission mode and a signal-to-interference plus noise ratio (SINR) variance for the subscriber station, and selecting a coding rate threshold based on the transmission mode, the transmission mode comprising one of localized mode and distributed mode, the localized mode comprises a contiguous set of subcarriers allocated for transmission and the distributed mode comprises a distributed set of subcarriers allocated for transmission.

12. The method as set forth in claim 11, further comprising, for each of the subscriber stations, selecting the transmission mode based on a speed of the subscriber station.

13. The method as set forth in claim 12, the transmission mode comprising localized when a speed of the subscriber station is low and distributed when a speed of the subscriber station is high.

14. The method as set forth in claim 11, further comprising, for each of the subscriber stations, selecting a high coding rate threshold when the transmission mode is localized and selecting a low coding rate threshold when the transmission mode is distributed.

15. For use in a multi-carrier wireless network, a base station capable of providing adaptive modulation and coding for a plurality of subscriber stations, the base station comprising an adaptive modulation and coding (AMC) unit operable, for each of the subscriber stations, to receive a signal-to-interference-plus-noise ration (SINR) variance from the subscriber station, and select a type of modulation and a coding rate based on the SINR variance.

16. The base station as set forth in claim 15, the AMC unit comprising an SINR variance classifier operable, for each of the subscriber stations, to classify the SINR variance as one of low and high.

17. The base station as set forth in claim 16, the AMC unit further operable, for each of the subscriber stations, to select a high coding rate threshold when the SINR variance classifier classifies the SINR variance as low and to select a low coding rate threshold when the SINR variance classifier classifies the SINR variance as high.

18. The base station as set forth in claim 15, the AMC unit further operable, for each of the subscriber stations, to select a coding rate threshold based on the SINR variance.

19. The base station as set forth in claim 15, the AMC unit comprising an SINR variance estimator operable, for each of the subscriber stations, to estimate the SINR variance based on at least one SINR parameter.

20. The base station as set forth in claim 19, the at least one SINR parameter comprising at least one of Doppler, delay spread and antenna correlation.

21. The base station as set forth in claim 19, the AMC unit further comprising an SINR parameters estimator operable, for each of the subscriber stations, to estimate the at least one SINR parameter based on uplink measurements.

22. The base station as set forth in claim 15, the AMC unit comprising a transmission mode selector operable, for each of the subscriber stations, to select a transmission mode for the subscriber station based on a speed of the subscriber station, the AMC unit operable to select a type of modulation and a coding rate based on the SINR variance by selecting a type of modulation and a coding rate based on the transmission mode for the subscriber station.

23. The base station as set forth in claim 22, the transmission mode comprising one of localized and distributed.

\* \* \* \* \*